(12) United States Patent
Morris et al.

(10) Patent No.: US 8,415,021 B2
(45) Date of Patent: Apr. 9, 2013

(54) BIODEGRADABLE STARCH-CONTAINING COMPOSITION WITH IMPROVED TEAR STRENGTH

(75) Inventors: Barry Alan Morris, Wilmington, DE (US); Edward J. Stancik, Diamondhead, MS (US); Mark F. Teasley, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/004,059

(22) Filed: Jan. 11, 2011

(65) Prior Publication Data
US 2011/0177269 A1 Jul. 21, 2011

Related U.S. Application Data

(60) Provisional application No. 61/296,757, filed on Jan. 20, 2010.

(51) Int. Cl.
*B32B 27/06* (2006.01)
*B32B 27/36* (2006.01)

(52) U.S. Cl. ........ 428/480; 428/35.7; 428/36.9; 524/47; 528/302; 525/444; 264/500

(58) Field of Classification Search ................ 428/35.7, 428/36.9, 480; 524/47; 528/302; 525/444; 264/500
See application file for complete search history.

(56) References Cited

U.S. PATENT DOCUMENTS

| | | | |
|---|---|---|---|
| 5,043,196 A | 8/1991 | Lacourse | |
| 5,314,754 A | 5/1994 | Knight | |
| 5,322,866 A | 6/1994 | Mayer | |
| 5,374,304 A | 12/1994 | Frische | |
| 6,235,815 B1 | 5/2001 | Loercks | |
| 6,348,524 B2 | 2/2002 | Bastioli | |
| 6,472,497 B2 | 10/2002 | Loercks | |
| 6,962,950 B1 | 11/2005 | Bastioli | |
| 7,176,251 B1 | 2/2007 | Bastioli | |
| 7,326,743 B2 | 2/2008 | Yu | |
| 2003/0187149 A1 | 10/2003 | Schmidt | |
| 2007/0241483 A1 | 10/2007 | Bastioli | |
| 2008/0038496 A1 | 2/2008 | Bastioli | |
| 2009/0075346 A1 | 3/2009 | Chen et al. | |
| 2009/0123767 A1 | 5/2009 | Gohil | |
| 2011/0213056 A1* | 9/2011 | Hasty et al. | 524/47 |

FOREIGN PATENT DOCUMENTS

| | | |
|---|---|---|
| EP | 0965615 A1 | 12/1999 |
| WO | 2008014573 A1 | 2/2008 |

* cited by examiner

*Primary Examiner* — Michael C Miggins

(57) ABSTRACT

Disclosed is a composition comprising an aliphatic-aromatic copolyester consisting essentially of a dicarboxylic acid component that includes a terephthalic acid component and a linear aliphatic dicarboxylic acid component; and a glycol component consisting essentially of a linear aliphatic glycol component and 0 to 4 mole percent based on 100 mole percent total glycol component of a dialkylene glycol component; starch; optionally water; and polyol plasticizer. Also disclosed are shaped articles such as films which exhibit greater than expected tear strength and methods for preparing the films.

20 Claims, No Drawings

US 8,415,021 B2

BIODEGRADABLE STARCH-CONTAINING COMPOSITION WITH IMPROVED TEAR STRENGTH

This application claims priority to U.S. provisional application Ser. No. 61/296,797, filed Jan. 20, 2010; the entire disclosure of which is incorporated herein by reference.

This invention relates to a biodegradable composition comprising a compostable copolyester and starch, and articles prepared from the composition. The invention also relates to a method for improving tear strength of films comprising copolyesters.

BACKGROUND

Packaging materials are increasingly being scrutinized as contributors to litter and other sustainability issues. One solution is to make packaging out of compostable materials. A number of biodegradable starch-containing materials have been developed recently.

Starch-containing compositions have been used to provide biodegradable resin compositions useful for manufacture of shaped articles such as rigid sheet, flexible film, or molded articles (see, for example, U.S. Pat. Nos. 5,043,196, 5,314,754, 5,322,866, 5,374,304, and 7,326,743 and WO2008014573, which describe starch compounded into various water soluble polymers). "Thermoplastic starch" compositions using biodegradable polymers as melting aids have been disclosed in U.S. Pat. Nos. 6,235,815 and 6,472,497 and US20030187149. Other starch-containing compositions include those described in U.S. patent application Ser. No. 61/254,951.

There is a sizable market for compostable trash bags, shopping bags and the like that is currently served by blends of starch and compostable polyesters. The predominant compostable water-insoluble polyester is a copolymer of 1,4-butanediol, terephthalic acid and adipic acid (PBAT), all derived from petroleum sources. PBAT polymers are commercially available under the tradename ECOFLEX® from BASF. Thermoplastic starch compositions have been made from PBAT by compounding the polymer with starch, glycerol and water, as taught in U.S. Pat. Nos. 6,348,524, 6,962,950, 7,176,251, and published patent applications US20070241483(A1) and US200838496(A1).

An even more sustainable approach is to derive the compostable polyester copolymer from one or more bio-sourced monomers. This would significantly reduce the environmental footprint (non-renewable energy consumption and greenhouse gas emissions) of the bag.

For example, E. I. du Pont de Nemours and Company ("DuPont") has recently developed aliphatic-aromatic copolyesters based on bio-sourced 1,3-propanediol (PDO), including copolymers derived from copolymerization of bio-PDO, terephthalic acid (petroleum sourced) and sebacic acid (bio-sourced from castor beans) that comprise over 50% bio-sourced components (See International Application Numbers PCT/US09/67875 and PCT/US09/67863 and US2009/0123767).

While these 1,3-propanediol-terephthalate-sebacic acid compositions closely match the thermal and compostability properties of commercially-available PBAT, they fall short in tensile and mechanical properties and in particular tear strength, a key requirement for films. In addition, blown films made from these polymers exhibit anisotropy in tear strength: the tear resistance in the machine direction is substantially less than in the transverse direction. PBAT films have more balanced tear strength.

Adding additional monomers, such as phthalic anhydride, can improve tear strength (See International Application Numbers PCT/US09/67831, PCT/US09/67838 and PCT/US09/67850). But these copolymers also exhibit anisotropic tear resistance in blown films.

It is desirable to obtain additional compostable compositions that are sourced from biological sources instead of petroleum sources that provide good tensile and mechanical properties for articles made from the compositions. One such mechanical property is tear strength, which is desirable for packaging film applications, including biodegradable trash bags.

SUMMARY OF THE INVENTION

The invention is directed to a composition comprising, or consisting essentially of, based on the weight of the composition, 40 to 70 weight % of an aliphatic-aromatic copolyester, 20 to 50 weight % of starch, 2 to 10 weight % of polyol plasticizer, and 0 to 10 weight % of water wherein
the aliphatic-aromatic copolyester comprises or consists essentially of:
 I. a dicarboxylic acid component consisting essentially of, based on 100 mole percent total acid component:
  a. about 80 to 40 mole percent of terephthalic acid component;
  b. about 20 to 60 mole percent of a linear aliphatic dicarboxylic acid component wherein the acid has from 7 to 36 carbon atoms; and
 II. a glycol component consisting essentially of a linear aliphatic glycol component and 0 to 4 mole percent, based on 100 mole percent total glycol component, of a dialkylene glycol component.

The invention also provides a method for preparing a film comprising the copolyester described above; the method comprising (1) melt blending the copolyester with starch, water and polyol plasticizer to provide a blended composition; and (2) preparing a film comprising the blended composition by blown film extrusion; wherein the film comprising the blended composition has a tear strength measured in the machine direction at least 3 times greater than the tear strength measured in the machine direction of a film comprising a composition comprising the copolyester that does not comprise the starch, water and polyol plasticizer.

The invention also provides an article prepared from the composition described above.

DETAILED DESCRIPTION OF THE INVENTION

All references, patents and publications, cited in this description to more fully describe the state of the art to which this invention pertains are incorporated by reference.

The composition described herein can be processed into films with enhanced tear strength that are compostable. Biodegradable copolyesters have previously been blended with starch to provide compostable resins. Adding starch to such copolyesters increases the tear strength of a film prepared from the copolyester/starch blend compared to a film prepared from the copolyester that is not blended with starch. Surprisingly, the addition of starch increased the tear strength of a film comprising a blend comprising starch and an aromatic/aliphatic copolymer described herein substantially more than a film comprising a PBAT/starch blend compared to films prepared from the non-starch-containing copolymers.

The Copolyester

The composition includes an aliphatic-aromatic copolyester, which is typically semicrystalline and biodegradable. The copolyesters useful in the composition are prepared via the copolymerization of terephthalic acid or derivatives thereof and a linear aliphatic dicarboxylic acid or derivatives with a linear aliphatic glycol component.

Note that the ester-forming derivatives of the acids may be used. The terms "diol" and "glycol" are used interchangeably to refer to general compositions of a primary, secondary, or tertiary alcohol containing two hydroxyl groups. The term "semicrystalline" is intended to indicate that some fraction of the polymer chains of the aromatic-aliphatic copolyesters reside in a crystalline phase with the remaining fraction of the polymer chains residing in a non-ordered glassy amorphous phase. The crystalline phase is characterized by a melting temperature, Tm, and the amorphous phase by a glass transition temperature, Tg, which can be measured using Differential Scanning Calorimetry (DSC).

The dicarboxylic acid component of the copolyester may consist essentially of between about 80 and 40 mole percent of a terephthalic acid component, between about 20 and 60 mole percent of a linear aliphatic dicarboxylic acid component, based on 100 mole percent of total dicarboxylic acid component.

Notably, the dicarboxylic acid component may consist essentially of between about 62 and 48 mole percent of an aromatic dicarboxylic acid component and between about 38 and 52 mole percent of an aliphatic dicarboxylic acid component based on 100 mole percent of total dicarboxylic acid component. Alternatively, the dicarboxylic acid component may consist essentially of between about 56 and 50 mole percent of an aromatic dicarboxylic acid component and between about 44 and 50 mole percent of an aliphatic dicarboxylic acid component based on 100 mole percent of total dicarboxylic acid component.

Terephthalic acid components that are useful in the aliphatic-aromatic copolyesters include terephthalic acid, bis (glycolates) of terephthalic acid, and lower alkyl esters of terephthalic acid having 8 to 20 carbon atoms. Specific examples of desirable terephthalic acid components include terephthalic acid, dimethyl terephthalate, bis(2-hydroxyethyl)terephthalate, bis(3-hydroxypropyl)terephthalate, bis (4-hydroxybutyl)terephthalate.

Linear aliphatic dicarboxylic acid components that are useful in the aliphatic-aromatic copolyesters include unsubstituted and methyl-substituted aliphatic dicarboxylic acids having from 7 to 36 carbon atoms, or from 7 to 24 carbon atoms or from 7 to 16 carbon atoms, preferably from 8 to 36 carbon atoms or from 8 to 24 carbon atoms, or from 8 to 16 carbon atoms, and their lower ($C_1$ to $C_6$) alkyl esters. Specific examples of desirable linear aliphatic dicarboxylic acid components include 3,3-dimethylglutaric acid, pimelic acid, suberic acid, azelaic acid, dimethyl azelate, sebacic acid, dimethyl sebacate, undecanedioic acid, 1,10-decanedicarboxylic acid, 1,11-undecanedicarboxylic acid (brassylic acid), 1,12-dodecanedicarboxylic acid, hexadecanedioic acid, docosanedioic acid, tetracosanedioic acid, and mixtures derived therefrom. Preferably, the linear aliphatic dicarboxylic acid component is selected from the group consisting of azelaic acid, sebacic acid, and brassylic acid and their corresponding lower alkyl esters, more preferably sebacic acid and its lower alkyl esters. Preferably the azelaic acid, sebacic acid or brassylic acid is derived from a renewable biological source. However, essentially any linear aliphatic dicarboxylic acid within the limits of the carbon count defined above or known ester-forming derivative can be used, including mixtures thereof.

The glycol component consists essentially of a linear aliphatic glycol component, and about 0 to 4 mole percent of a dialkylene glycol component.

Linear aliphatic glycol components that are useful include unsubstituted and methyl-substituted aliphatic diols with 2 to 10 carbon atoms. Examples include 1,2-ethanediol, 1,2-propanediol, 1,3-propanediol, 2,2-dimethyl-1,3-propanediol, and 1,4-butanediol, preferably 1,2-ethanediol, 1,3-propanediol, and 1,4-butanediol, more preferably 1,3-propanediol and 1,4-butanediol, most preferably 1,3-propanediol. Preferably, the linear aliphatic glycol components are derived from a renewable biological source, in particular 1,3-propanediol or 1,4-butanediol.

The 1,3-propanediol is preferably obtained biochemically from a renewable source ("biologically-derived" 1,3-propanediol). Biologically-derived 1,3-propanediol can be obtained using methods described in International Application Number PCT/US09/67863 and references therein.

The biologically-derived 1,3-propanediol, and polytrimethylene terephthalate copolyesters based thereon, may be distinguished from similar compounds produced from a petrochemical source or from fossil fuel carbon by dual carbon-isotopic finger printing as described in International Application Number PCT/US09/67863 and references therein.

As used herein, "dialkylene glycol" refers to dihydroxyl ethers resulting from dimerization of the linear aliphatic glycols described herein. Dialkylene glycol components of the copolymer can be added to the polymerizations as monomers, but may be generated in situ by dimerization of the linear glycol components under the conditions required for polymerization. For example, polymerizations involving 1,3-propanediol may form the dimer "dipropylene glycol." Methods to control the dimerization of the linear glycols include monomer selection such as a choice between dicarboxylic acids and their derivatives or inclusion of sulfonated monomers, catalyst selection, catalyst amount, inclusion of strong protonic acids, addition of basic compounds such as tetramethylammonium hydroxide, addition of buffer compounds such as sodium acetate, and other process conditions such as temperatures and residence times. The dialkylene glycol component may be present in an amount from 0 to about 4 mole percent based on 100 mole percent total glycol component. When present, the dialkylene glycol component is present in an amount from about 0.1 mole percent to 4 mole percent, based on 100 mole percent total glycol component, or from about 0.1 mole percent to 2 mole percent, typically from about 0.1 mole percent to about 1 mole percent, and more typically from about 0.2 mole percent to 0.7 mole percent.

The aliphatic-aromatic copolyesters may be polymerized from the disclosed monomers by any process known for the preparation of polyesters. Such processes can be operated in either a batch, semi-batch, or in a continuous mode using suitable reactor configurations. For example, the copolyester may be prepared according to methods described in International Application Numbers PCT/US09/67831, PCT/US09/67838 and PCT/US09/67850, PCT/US09/67863 and PCT/US09/67875 and US Patent Application Publication 2009/0123767.

Of note are copolyesters comprising copolymerized terephthalic acid (or derivatives), sebacic acid (or derivatives) and 1,3-propanediol (designated herein as 3GTSeb copolyesters). As discussed above, these copolyesters may also comprise a dialkylene glycol component resulting from dimerization of the 1,3-propanediol during copolymerization.

Desirably, the aliphatic-aromatic copolyesters have sufficiently high molecular weights to provide suitable melt viscosity for processing into shaped articles, and useful levels of mechanical properties in said articles. Weight average molecular weights (Mw) from about 20,000 g/mol to about 150,000 g/mol may be useful, for example from about 50,000 g/mol to about 130,000 g/mol or from about 80,000 g/mol to about 110,000 g/mol. In practical terms, molecular weights are often correlated to solution viscosities, such as intrinsic or inherent viscosity. While the exact correlation depends on the composition of a given copolymer, the molecular weights above generally correspond to intrinsic viscosity (IV) values from about 0.5 dL/g to about 2.0 dL/g. More typical are IV values from about 1.0 dL/g to about 1.8 dL/g. Most typical are IV values from about 1.3 dL/g to about 1.6 dL/g.

Although the copolyesters prepared by the processes disclosed in references above reach satisfactory molecular weights, it can be expedient to use chain extenders to rapidly increase the molecular weights and minimize their thermal history while reducing the temperature and contact time of the interchange and polycondensation steps of the process. Suitable chain extenders include diisocyanates, polyisocyanates, dianhydrides, diepoxides, polyepoxides, bis-oxazolines, carbodiimides, and divinyl ethers, which can be added at the end of the polycondensation step, during processing on mechanical extrusion equipment, or during processing of the copolyesters into desired shaped articles. Specific examples of desirable chain extenders include hexamethylene diisocyanate, 4,4'-methylenebis(phenylisocyanate) (also known as methylene-diphenyl diisocyanate or MDI), and pyromellitic dianhydride. Such chain extenders are typically used at 0.1 to 2 weight percent with respect to the copolyesters.

The molecular weights of the aliphatic-aromatic copolyesters can also be increased by post-polymerization processes, such as solid-phase polymerization and vacuum extrusion, both of which are described in greater detail in the references above.

Alternatively, the melt viscosity can be increased by incorporating a branching agent into the copolyesters during polymerization to introduce long-chain branches. Suitable branching agents and their use are described in the references above.

Additionally, the thermal behavior of the copolyesters can be adjusted somewhat by incorporating nucleating agents during polymerization or processing of the copolyesters to accelerate their crystallization rates and provide a more uniform distribution of crystallites throughout the bulk of the polymer. Suitable nucleating agents and their use are described in the references above.

Starch

The first non-synthetic polymer component of the blended composition is starch. As used herein, the term "starch" unless otherwise specified includes any of the various starches described below. Any starch, including those described below, is suitable for use as the first additive component of the copolyester/starch blend composition.

Starch is a polysaccharide carbohydrate consisting of a large number of glucose units joined together by glycosidic bonds produced by essentially any green plant. Commercial sources of starch include but are not limited to cereal grains or root crops such as wheat, corn, rice, oat, arrowroot, pea and potato. Starch consists of two fractions: amylose, having a linear and helical molecular morphology, and amylopectin, having a branched morphology. Depending on the plant, naturally-occurring starch from plant sources generally contains 20 to 25% amylose and 75 to 80% amylopectin.

Examples of commercially available natural starches include native common corn starch, available as Cargill Native Gel 03420 from Cargill, Inc., Cedar Rapids, Iowa and hydrolyzed potato starch, available as PENBIND® 800 starch from Penford Food Ingredients, Centennial, Colo.

As described in greater detail in U.S. Pat. Nos. 5,043,196 and 5,314,754 various corn hybrids have been developed that provide starches of high amylose content and which have been available commercially since about 1963. As used herein "high amylose starch" refers to any starch with an amylose content of at least 45% and preferably at least 65% by weight. U.S. Pat. No. 5,374,304 discloses specialty amyloses obtained by treatment of high amylose starches with formamide solution with a small proportion of dichloroacetic acid. Additionally, high amylose starch can be obtained by separation or isolation such as by the fractionation of a native starch material or by blending isolated amylose with a native starch.

Starch can also be derivatized or modified by typical processes known in the art, e.g., esterification, etherification, oxidation, acid hydrolysis, crosslinking and enzyme conversion. Modified starches include esters, such as the acetate and the half-esters of dicarboxylic acids, particularly the alkenyl-succinic acids; ethers, such as the hydroxyethyl- and hydroxypropyl starches and starches reacted with hydrophobic cationic epoxides; starches oxidized with hypochlorite; starches reacted with cross-linking agents such as phosphorus oxychloride, epichlorohydrin, phosphate derivatives prepared by reaction with sodium or potassium orthophosphate or tripolyphosphate (phosphate starches) and combinations thereof. Other starch derivatives include thermoplastic starch, cationic starch, anionic starch, alkyl starches, amine starches and dialdehyde starches. Anhydrides such as maleic, phthalic, or octenyl succinic anhydride can also be used to produce ester derivatives. These and other conventional modifications of starch are described in publications such as "Starch: Chemistry and Technology", Second Edition, edited by Roy L. Whistler et al. Chapter X; Starch Derivatives: Production and Uses by M. W. Rutenberg et al., Academic Press, Inc., 1984. These processes can be used to modify any starch, including high amylose starches. Thermoplastic starch can be produced, for example, as disclosed in U.S. Pat. No. 5,362,777. Combinations of the various starches and starch derivatives listed above may also be used.

One modification of note is etherification with alkylene oxides, particularly those containing 2 to 6, preferably 2 to 4, carbon atoms. Ethylene oxide, propylene oxide and butylene oxide are exemplary compounds useful in etherifying the starting starch materials. Propylene oxide is preferred, providing "hydroxypropylated" starches. Other substituents can be hydroxyethyl or hydroxybutyl to form hydroxyether substitutions. U.S. Pat. Nos. 5,043,196; 5,314,754 and 7,326,743 describe various modified high amylose starches. The degree of substitution (the average number of hydroxyl groups in a unit that are substituted) for any of these modifications may be 0.05 to 2.

Mixtures of unmodified or modified starch can be used as the starch component of the composition. Any mixture may be used, such as from 5 to 95 weight % of modified starch in the starch component. The upper limit to the content of the modified starch may be determined largely by its cost. Hydroxypropylated amylose is a useful modified starch. Notable starches include high amylose maize starch, and hydroxypropylated high amylose starch.

Unmodified starches and starches other than hydroxypropylated high amylose starch are also useful.

Another starch that may be used is ReNew® 400 resin, available from StarchTech, Inc, Golden Valley, Minn., and is comprised of starch and optionally biodegradable polymers. The starch used is an unmodified industrial grade starch, typically from wheat, corn, and/or potato. ReNew® 400 resin is certified to meet EN 13432, which means that a biodegradation level of at least 90% is reached in less than 6 months under controlled composting conditions. While the composition of ReNew® 400 is a trade secret, it is known from U.S. Pat. No. 5,095,054 that biodegradable loose-fill resins have improved properties when they contain a substantially water-insoluble thermoplastic polymer. Extraction of ReNew® 400 with toluene solvent yielded about 2 weight % on a dry basis of substantially water-insoluble thermoplastic polymer(s).

Water and Polyol Plasticizers

Water "gelatinizes" (a process also known as destructuring or melting) the starch to form a polymeric gel structure. In order to provide appropriate starch gelatinization, high water levels are used. Once gelatinized, excess water can be removed from the starch composition by drying the composition to reach relatively low water levels before the composition is further processed. Water may also act as a plasticizer in that it softens the material or reduces the modulus. The rheology of the composition is strongly influenced by the presence of water. High water content of the composition, such as above 10 weight %, results in relatively low viscosity. A low water content, such as 0.5 weight % water, results in much higher viscosity of the composition.

It is desirable that the total moisture content of the starch-containing composition be at a level of 25% or less by weight. By total moisture or water content is meant both the residual moisture of the starch (that is the amount absorbed while stored at ambient conditions) and the amount of water fed to the polymer processing equipment, e.g. an extruder. Typically, starch may contain about 9 to 12% residual moisture before drying. "Pre-gelatinized" starch may have about 6 weight % water or less after drying. Enough water must be present to allow the material to be processed, for example mixing and heating to the desired temperatures. While some water may be added to the extruder, only an amount which will bring the total moisture level to 25% or less can be added. Accordingly, while the total moisture content that is used for carrying out the invention may vary somewhat, depending on the actual material used and other process variations, a range of added water from about 0.05 to 10%, preferably from about 1 to 10% and more preferably from about 1 to 7% by weight of total composition, will generally be suitable. The amount of water in the final composition or articles prepared therefrom may also be influenced by volatilization of water during processing of the copolyester/starch blend.

Another non-polymeric component of the composition is a polyol plasticizer. Suitable polyol plasticizers include organic compounds containing more than one hydroxyl group per molecule or derivatives thereof. Derivatives of the polyols include esters such as acetates. Preferred polyol plasticizers have a molecular weight in the range of 50-6000, more preferably 50-2500, and still more preferably 100-400. They are preferably selected from the group consisting of sorbitol, glycerol (also known as glycerin), maltitol, xylitol, mannitol, erythritol, di- or polyglycerol, glycerol mono- and diesters of fatty acids, glycerol acetates such as glycerol mono- or diacetate, polyethylene oxide, ethylene glycol, diethylene glycol or polyethylene glycol, trimethylolpropane, pentaerythritol; more preferably glycerol, maltitol, sorbitol, erythritol and/or xylitol. Other plasticizers which may be used include invert sugar and corn syrup.

The polyol plasticizers have a range of molecular sizes and weights that allow for different degrees of association with starch. Higher molecular weight plasticizers such as maltitol increase the modulus of the composition, while low molecular weight plasticizers such as glycerol are very volatile and may be lost during drying or processing of the composition. Mixtures of plasticizers may be desirable since a high level of a single plasticizer may result in incomplete mixing with the starch. Useful mixtures of plasticizers include a mixture of at least two plasticizers selected from the group consisting of glycerol, maltitol, sorbitol, erythritol and xylitol, such as a mixture of sorbitol, maltitol and glycerol, and a mixture of sorbitol, xylitol and glycerol. Another useful combination includes water and glycerin, such as a combination, by weight, of about 6 parts glycerin and 4 parts water.

U.S. Pat. No. 5,374,304 discloses compositions of specialty high amylose starch and a glycerol plasticizer. U.S. Pat. Nos. 5,314,754 and 7,326,743 describe various modified high amylase starches in compositions with water and polyol plasticizers such as glycerol. These compositions may be blended with the copolyester without the addition of additional water or plasticizer.

The compositions may further comprise small amounts of optional materials commonly used and well known in the polymer art, such as disclosed in WO2008/014573. Such materials include lubricants, emulsifiers and antioxidants.

Lubricants include one or more fatty acids and fatty acid salts. The fatty acids include saturated (preferably saturated) or unsaturated monobasic carboxylic acids. Monobasic carboxylic acids include acids having only one carboxylic acid moiety. Particularly useful fatty acids include $C_4$ to less than $C_{36}$ (e.g., $C_{34}$), more particularly $C_6$ to $C_{26}$, and even more particularly $C_6$-$C_{22}$ acids. Specific organic acids include, but are not limited to, lauric acid, myristic acid, palmitic acid, stearic acid, behenic acid, erucic acid, montanic acid, oleic acid, and linoleic acid. Saturated acids are preferred. Salts of the fatty acids include sodium, potassium and calcium salts such as calcium stearate, sodium montanate, sodium stearate and potassium stearate. The amount of fatty acid and/or fatty acid salt may be from 0.1-5.0 parts, preferably 0.2 to 3 parts per hundred parts of the composition (i.e. copolyester, starch, water and polyol plasticizer). Other lubricants include amides of fatty acids such as erucamide.

Emulsifiers include those wherein the hydrophilic lipophilic balance (HLB) is between 1 and 22. Emulsifiers include propylene glycol monostearate, glycerol monooleate, glycerol monostearate, acetylated monoglycerides (stearate), sorbitan monooleate, propylene glycol monolaurate, sorbitan monostearate, calcium stearoxyl-2-lactylate, glycerol monolaurate, sorbitan monopalmitate, soy lecithin, diacetylated tartaric acid esters of monoglycerides, sodium stearoyl lactylate, and sorbitan monolaurate. Emulsifiers may be present at a level of from 0.2 to 3 parts per hundred parts of the composition and act to stabilize mechanical properties and increase homogeneity of the blend. They may also provide a defoaming effects and antiretrodegradation effects. Glycerol monostearate (for example at 1 to 1.5 parts per hundred parts composition) and sodium stearoyl lactylate (for example at 0.25 to 1.5 parts per hundred parts composition) and combinations thereof are notable.

Primary and secondary antioxidants include butylated phenol derivatives such as for example IRGANOX® 1010, phosphites such as IRGAFOS® 168, sulfating agents such as sulfur dioxide, sodium sulfite, sodium and potassium bisulfites and metabisulfites, citric acid, optionally combined with ascorbic acid or sodium bisulfite and tocopherol. Antioxidants may be included at up to about 2 parts per hundred parts composition.

Other additives include stabilizers including viscosity stabilizers, heat stabilizers, and hydrolytic stabilizers, ultraviolet ray absorbers and stabilizers, compatiblizers, anti-static agents, and fire-retardants. Such additives also include flow enhancers, slip agents, rheology modifiers, tougheners, pigments, antiblocking agents, inorganic and organic fillers, such as silica, clay, talc, chalk, titanium dioxide, carbon black, wood flour, keratin, chitin, refined feathers and reinforcing fibers, such as glass fibers and natural fibers like paper, jute and hemp. Any of these additives may be added individually or in combination to the copolyester/starch blend composition. Many such additives are described in the *Kirk Othmer Encyclopedia of Chemical Technology*, 5th edition, John Wiley & Sons (Hoboken, 2005). The additives are preferably nontoxic, biodegradable, and derived from renewable biological sources. These conventional ingredients may be present in the compositions in quantities that are generally from 0.01 to 5 parts per hundred parts composition, so long as they do not detract from the basic and novel characteristics of the composition and do not significantly adversely affect the performance of the material prepared from the composition.

The aliphatic-aromatic copolyester/starch blends can be used to make a wide variety of shaped articles. Shaped articles include films, sheets, fibers, filaments, bags, melt blown containers, molded parts such as cutlery, coatings, polymeric melt extrusion coatings on substrates, polymeric solution coatings onto substrates, laminates, and bicomponent, multilayer, and foamed varieties of such shaped articles. The aliphatic-aromatic copolyester/starch blends are useful in making any shaped article that can be made from a polymer. The aliphatic-aromatic copolyester/starch blends can be formed into such shaped articles using any known process, including thermoplastic processes such as compression molding, thermoforming, extrusion, coextrusion, injection molding, blow molding, melt spinning, film casting, film blowing, lamination, foaming using gases or chemical foaming agents, or any suitable combination thereof to prepare the desired shaped article.

Shaped articles, particularly those that find use in packaging, including films, bags, containers, cups, and trays among others, are typically desired to be compostable. The current standards for compostable packaging and packaging materials are described in ASTM D6400-04 and EN 13432:2000. As the more stringent standard, EN 13432 is more pertinent for the qualification of new compostable packaging materials. To qualify as compostable, the packaging desirably disintegrate in 3 months under the conditions of an industrial composting facility and biodegrade to carbon dioxide at the level of 90% in 6 months without any negative impact due to toxicity on the composting process or on plant growth using the resulting compost. In this regard, the aliphatic-aromatic copolyesters disclosed herein can be said to be biodegradable when their shaped articles used as packaging materials, such as films, are shown to be compostable. The shaped articles may comprise films that are compostable at thicknesses of up to 20 microns, or up to 70 microns, or up to 120 microns, or greater than 120 microns.

The aliphatic-aromatic copolyester/starch blends described herein are particularly well suited for the extrusion and blowing of compostable films with high tear strength.

Also provided is a method for preparing a film comprising the copolyester described above; the method comprises (1) melt blending the copolyester with starch, water and polyol plasticizer to provide a blended composition and (2) preparing a film comprising the blended composition by, e.g., blown film, extrusion. The film comprising the blended composition has a tear strength measured in the machine direction at least 3 times greater, or at least 4 times greater, or at least 9 times greater, than the tear strength measured in the machine direction of a film made from the copolyester.

The magnitude of improvement in tear strength when using the copolyester/starch blend describe herein is surprising compared to the improvement in tear strength observed when starch blends with other copolyesters are used to prepare films.

Films are commonly tested for tear strength according to the Elmendorf method as described in ASTM D1922-09. In typical applications for films or articles prepared from films such as bags, the tear strength is preferably at least 1000 g/mm, but higher values, such as those greater than 5000 g/mm are desirable as they allow a thinner gauge to be used. Values greater than 8000 g/mm, 10,000 g/mm, 12,000 g/mm, 15,000 g/mm, 16,000 g/mm or even 20,000 g/mm can provide additional benefits when balanced with other properties desired for a given application. The aliphatic-aromatic copolyester/starch blends provide films that can attain these levels of tear strength and that show enhancement in tear strength when compared to prior art copolyesters with similar terephthalic acid contents. The enhancement is particularly apparent when the linear glycol is 1,3-propanediol. Hence, the enhancement in tear strength can be reasonably expected to be apparent when other linear glycols are used.

Notably a film comprising the blended composition has a tear strength measured in the machine direction at least 3 times greater, or at least 4 times greater, or at least 9 times greater, than the tear strength measured in the machine direction of a film comprising a composition comprising the copolyester that does not comprise the starch, water and polyol plasticizer.

The invention is illustrated by the following embodiments.

EXAMPLES

Materials

S-1: native common corn starch, available as Cargill Native Gel 03420 from Cargill, Inc., Cedar Rapids, Iowa.

PBAT-1: a copolymer of 1,4-butanediol, terephthalic acid and adipic acid, commercially available under the tradename ECOFLEX® FBX 7011 from BASF, with IV of about 1.3 dL/g. 3GTSeb-1: a copolymer prepared according to the procedure of International Application Number PCT/US09/67863 containing 49.7 mole % of 1,3-propanediol, 27.1 mole % of dimethyl terephthalate, 23.0 mole % of sebacic acid, 0.2 mole % of dipropylene glycol, and 300 ppm Na of sodium acetate trihydrate, with IV of about 1.2 dL/g.

3GTSeb-2: a dry blend of similar small batches of copolymer prepared according to the procedure of International Application Number PCT/US09/67863 giving an average composition of about 49.7 mole % of 1,3-propanediol, 26.4 mole % of terephthalic acid, 23.6 mole % of sebacic acid and 0.3 mole % of dipropylene glycol, with IV of about 1.6 dL/g.

Compositions of neat copolyester were obtained and copolyester/starch blend compositions were prepared by melt blending the copolymer, starch S-1, water and glycerol using procedures adapted from the methods taught in U.S. Pat. Nos. 6,348,524, 7,176,251, 6,962,950, and publications US2008/0038496(A1), and US2007/0241483(A1)). The compositions were made on an 18 mm or 30 mm twin screw extruder with length to diameter ratios of 41 and 43, respectively. The polyester and starch were fed into a common feed hopper and the water and glycerol trickled in at the same location. In the 30 mm twin screw extruder process, the water and glycerol were first mixed and fed just downstream of the polymer and starch addition to prevent agglomeration of the starch and polymer in the feed hopper. Temperature profiles along the barrel were 180° C. to 205° C. for the 18 mm twin screw extruder and 130° C. to 150° C. for the 30 mm twin screw extruder. Residence time was 90 seconds or greater to ensure "cooking" of the starch. For the 30 mm twin screw extruder the screw speed was 300 rpm and the feed rate was 20 lb/hr. The 18 mm twin screw extruder was operated at 150 rpm and 4 lb/hr. The compositions are summarized in Table 1. Comparative examples are denoted by the letter "C" as in C1 for Comparative Example 1. A comparative PBAT-1/starch blend was prepared using commercially available copolyester.

TABLE 1

| Composition | C1 | C2 | C3 | 1 | C4 | 2 |
|---|---|---|---|---|---|---|
| Type | neat | blend | neat | blend | neat | blend |
| Copolyester | PBAT-1 | PBAT-1 | 3GTSeb-1 | 3GTSeb-1 | 3GTSeb-2 | 3GTSeb-2 |
| (wt %) | 100 | 62 | 100 | 62 | 100 | 62 |
| Starch (wt %) | 0 | 28 | 0 | 28 | 0 | 28 |
| Water (wt %) | 0 | 4 | 0 | 4 | 0 | 4 |
| Glycerol (wt %) | 0 | 6 | 0 | 6 | 0 | 6 |

Blown films about 2-mil in thickness were prepared from the neat and starch blend compositions summarized in Table 1 on a 0.75-inch-diameter Brabender extruder with a 1-inch-diameter annular blown film die with an air ring cooling system. The die gap was 40 mils. The blowup ratio (ratio of final film diameter to die diameter) was 2:1. Haul-off speed was 6 ft/min. Temperatures along the barrel ranged from 145 to 175° C., depending on the polymer composition.

Samples were prepared from the blown films and tested for Elmendorf tear resistance according to ASTM D1922 and tensile properties according to ASTM D882. The data for Elmendorf tear resistance are summarized in Table 2 and the data for tensile properties are summarized in Table 3.

In the Tables, "MD/TD" indicates the ratio of the property measured in the machine direction of the film to the property measured in the transverse direction of the film, "Blend/Neat" indicates the ratio of the property of the film prepared from the blend composition to the property of the film prepared from the neat composition, and "Copolymer ratio" indicates the ratio of the property of a sample film to the property of the corresponding film prepared from PBAT-1.

TABLE 2

| | Elmendorf Tear Resistance | | | | | |
|---|---|---|---|---|---|---|
| | Example | | | | | |
| | C1 | C2 | C3 | 1 | C4 | 2 |
| MD (g/mm) | 7025 | 18661 | 1384 | 5551 | 700 | 12323 |
| TD (g/mm) | 8391 | 19016 | 3047 | 5748 | 2478 | 23819 |
| MD/TD | 0.84 | 0.98 | 0.45 | 0.97 | 0.28 | 0.52 |
| Blend/Neat MD | — | 2.7 | — | 4.0 | — | 17.6 |
| Blend/Neat TD | — | 2.3 | — | 1.9 | — | 9.6 |
| Copolymer ratio MD | 1 | 1 | 0.20 | 0.3 | 0.10 | 0.66 |
| Copolymer ratio TD | 1 | 1 | 0.36 | 0.3 | 0.30 | 1.25 |

The tear resistance of either neat 3GTSeb film was substantially less than the neat PBAT-1 film, especially in the machine direction (MD). The tear resistance of the PBAT-1 film was balanced in the TD (transverse direction) and MD whereas the 3GTSeb films were highly anisotropic (MD tear resistance much less than TD tear resistance). There was little difference in tear resistance between the high IV 3GTSeb-2 and low IV 3GTSeb-1 films.

Adding starch to the polymer increased the tear resistance of films prepared from all the polymers. Surprisingly, the starch increased the tear resistance of the 3GTSeb films substantially more than the PBAT-1 film, to the point where the tear resistance of the high IV 3GTSeb-2 film was higher than that of the PBAT-1 film in the TD. The starch increases the tear strength of PBAT-1 by about a factor of 2 but that of the high IV 3GTSeb-2 by a factor of about 10 to 18. The anisotropy of the 3GTSeb films was also reduced by using the starch blend. The ratio of MD to TD tear strength increased from 0.45 to 0.97 for the low IV 3GTSeb-1 and 0.28 to 0.52 for high IV 3GTSeb-2. Before the addition of starch, the neat high IV 3GTSeb-2 film only had 10 to 30% of the tear resistance as the neat PBAT-1 film. Using the high IV 3GTSeb-2 copolyester/starch blend, the tear resistance of the resulting film was 66 to 125% of the PBAT-1/starch blend.

TABLE 3

Tensile Strength

| | Example | | | | | |
|---|---|---|---|---|---|---|
| | C1 | C2 | C3 | 1 | C4 | 2 |
| MD (psi) | 5269 | 2640 | 1270 | 1200 | 3440 | 2470 |
| TD (psi) | 3166 | 2300 | 1163 | 1380 | 3910 | 2460 |
| MD/TD | 1.66 | 1.14 | 1.09 | 0.87 | 0.88 | 1.00 |
| Blend/Neat MD | — | 0.5 | — | 0.9 | — | 0.7 |
| Blend/Neat TD | — | 0.7 | — | 1.2 | — | 0.6 |
| Copolymer ratio MD | 1 | 1 | 0.24 | 0.45 | 0.65 | 0.94 |
| Copolymer ratio TD | 1 | 1 | 0.37 | 0.60 | 1.23 | 1.07 |

The tensile strength of the neat low IV 3GTSeb-1 film was substantially less than the neat PBAT-1 film. The tensile strength of the neat high IV 3GTSeb-2 film was lower in the MD but higher in the TD than the neat PBAT-1 film.

The addition of the starch to the copolymer decreased the tensile strength for the high IV 3GTSeb-2 and PBAT-1 films. Surprisingly, the tensile strength was less impacted by the starch for the 3GTSeb blends, such that the TD tensile strength of the high IV 3GTSeb-2 blend was slightly higher than that of the PBAT-1 blend.

Additional examples of the compositions are described below. Copolyesters 3GTSeb-3 and 3GTSeb-4 were first synthesized in a batch process according to the procedure of International Application Number PCT/US09/67863 to an IV of about 1.2 dL/g. 3GTSeb-3 was prepared using terephthalic acid, while 3GTSeb-4 was a dry blend of several batches prepared using either terephthalic acid or dimethyl terephthalate. The IV was raised to approximately 1.5 dL/g by a reaction extrusion process conducted on an 18 mm or 30 mm twin screw extruder. Barrel temperature set points were 160° C. Methylene-diphenyl diisocyanate (MDI) was added to the polymer and introduced into the feed hopper of the extruder. MDI ranged from 0.3 to 0.5 wt %. The polymer feed rates were 2 and 35 lb/hr for the 18 and 30 mm twin screw extruders, respectively. Care was taken to keep the MDI dry before and as it was entering the extruder. The compositions are summarized in Table 4. Similarly, copolyesters 3GTSeb-5, 3GTSeb-6, and 3GTSeb-7 are prepared from 1,3-propanediol, dimethyl terephthalate, sebacic acid, and sodium acetate trihydrate by charging the reactor with the amounts listed in Table 4. Small amounts of dipropylene glycol may be formed during copolymerization, but are not listed. The IV of the copolyesters prepared were raised from about 1.2 to about 1.5 dL/g as described previously. The units in Table 4 are mole %, except that for sodium acetate, which is ppm Na by weight.

TABLE 4

| Copolymer | 1,3-propanediol | Terephthalic acid | Sebacic acid | Dipropylene glycol | Sodium acetate |
|---|---|---|---|---|---|
| 3GTSeb-3 | 49.5 | 27.1 | 22.9 | 0.5 | 0 |
| 3GTSeb-4 | 49.7 | 27.0 | 23.0 | 0.3 | 0 |
| 3GTSeb-5 | 50 | 25 | 25 | | 300 |
| 3GTSeb-6 | 50 | 26.5 | 23.5 | | 300 |
| 3GTSeb-7 | 50 | 26 | 24 | | 300 |

Copolyester/starch blends were prepared from 3GTSeb-3 and 3GTSeb-4 using a 30 mm twin screw extruder with length to diameter ratio of 43. The polyester and starch were fed into a common feed hopper and the water and glycerol were first mixed and fed just downstream of the polymer and starch addition to prevent agglomeration of the starch and polymer in the feed hopper. Temperature profiles along the barrel were 80, 130, 135 and 150° C. Residence time was 90 seconds or greater to ensure "cooking" of the starch. The screw speed was 300 rpm and feed rate 20 lb/hr. The sodium salt of montanic acid available from Clariant under the tradename LICOMONT® NAV 101 was added during compounding in Example 5. The compositions are summarized in Table 5. A comparative PBAT-1/starch blend was prepared using commercially available copolyester. Additional examples of the copolyester/starch blends were prepared using 3GTSeb-5, 3GTSeb-6 and 3GTSeb-7 according to the procedure of Example 3.

TABLE 5

| | Weight % Example | | | | | | |
|---|---|---|---|---|---|---|---|
| | C4 | 3 | 4 | 5 | 6 | 7 | 8 |
| Composition | blend | blend | blend | blend | blend | blend | blend |
| Copolyester | PBAT-1 | 3GTSeb-3 | 3GTSeb-4 | 3GTSeb-3 | 3GTSeb-5 | 3GTSeb-6 | 3GTSeb-7 |
| (wt %) | 60 | 60 | 62 | 59.82 | 60 | 60 | 60 |
| Starch | 30 | 30 | 28 | 30 | 30 | 30 | 30 |
| Water | 4 | 4 | 4 | 4 | 4 | 4 | 4 |
| Glycerol | 6 | 6 | 6 | 6 | 6 | 6 | 6 |
| NAV | 0 | 0 | 0 | 0.18 | 0 | 0 | 0 |

Blown films of Examples 3 to 8 can be prepared and tested for tear strength and tensile properties as previously described.

The invention claimed is:

1. A composition comprising, based on the weight of the composition, 40 to 70 weight % of an aliphatic-aromatic copolyester, 20 to 50 weight % of starch, 2 to 10 weight % of polyol plasticizer, and optionally up to 10 weight % of water wherein
   the copolyester comprises a dicarboxylic acid component and a glycol component;
   the dicarboxylic acid component consists essentially of, based on 100 mole percent total acid component, about 80 to 40 mole % of terephthalic acid component and about 20 to 60 mole % of a linear aliphatic dicarboxylic acid component; and the aliphatic dicarboxylic acid has from 7 to 36 carbon atoms;
   the glycol component consists essentially of a linear aliphatic glycol component and 0 to 4 mole percent, based on 100 mole percent total glycol component, of a dialkylene glycol component; and
   a film prepared from the composition has a tear strength measured in the machine direction at least 3 times greater than the tear strength measured in the machine direction of a film made from the copolyester.

2. The composition of claim 1 wherein the aliphatic glycol is 1,2-ethanediol, 1,3-propanediol, 1,4-butanediol, or combination of two or more thereof.

3. The composition of claim 1 wherein the aliphatic glycol is 1,3-propanediol or 1,4-butanediol.

4. The composition of claim 1 wherein the aliphatic dicarboxylic acid is azelaic acid, sebacic acid, brassylic acid, azelaic acid alkyl ester, sebacic acid alkyl ester, brassylic acid alkyl ester, or combinations of two or more thereof.

5. The composition of claim 1 wherein the tear strength of the film measured in the machine direction is at least 4 times greater than the tear strength measured in the machine direction of a film made from the copolyester.

6. The composition of claim 5 wherein the tear strength of the film measured in the machine direction is at least 9 times greater than the tear strength measured in the machine direction of a film made from the copolyester.

7. The composition of claim 1 wherein the aliphatic glycol is 1,3-propanediol.

8. The composition of claim 7 wherein the aliphatic dicarboxylic acid is sebacic acid or sebacic acid alkyl ester.

9. The composition of claim 8 wherein the copolyester is semicrystalline.

10. An article comprising or produced from a composition wherein the article is a film, a sheet, a fiber, a melt blown container, a molded part, or a foamed part and the composition is as recited in claim 1.

11. The article of claim 10 is the film having a tear strength measured in the machine direction at least 3 times greater than the tear strength measured in the machine direction of a film made from the copolyester.

12. The article of claim 11 wherein the tear strength of the film measured in the machine direction is at least 4 times greater than the tear strength measured in the machine direction of a film made from the copolyester.

13. The article of claim 11 wherein the tear strength of the film measured in the machine direction is at least 9 times greater than the tear strength measured in the machine direction of a film made from the copolyester.

14. A method comprising
melt blending a copolyester with starch, polyol plasticizer, and optionally water to produce a composition; and
extruding the composition, under a condition effective to produce a film having a tear strength, measured in the machine direction, of at least 3 times greater than the tear strength, measured in the machine direction, of a film produced by the same method from the copolyester wherein
the copolyester, the starch, the water; and the polyol plasticizer are each as recited in claim 1; and
the extruding is a blown film extrusion.

15. The method of claim 14 wherein the tear strength of the film measured in the machine direction is at least 4 times greater than the tear strength measured in the machine direction of a film made from the copolyester.

16. The method of claim 15 wherein the aliphatic glycol component is 1,2-ethanediol, 1,3-propanediol, 1,4-butanediol, or combination of two or more thereof; and the aliphatic dicarboxylic acid is azelaic acid, sebacic acid, brassylic acid, azelaic acid alkyl ester, sebacic acid alkyl ester, brassylic acid alkyl ester, or combinations of two or more thereof.

17. The method of claim 16 wherein the aliphatic glycol is 1,3-propanediol or 1,4-butanediol.

18. The method of claim 17 wherein the aliphatic glycol is 1,3-propanediol or 1,4-butanediol.

19. The method of claim 15 wherein the aliphatic glycol is 1,3-propanediol or 1,4-butanediol.

20. The method of claim 14 wherein the tear strength of the film measured in the machine direction is at least 9 times greater than the tear strength measured in the machine direction of a film made from the copolyester.

* * * * *